July 1, 1924.
H. A. WHITEHORN
CUTTING IMPLEMENT
Filed April 14, 1922
1,499,896
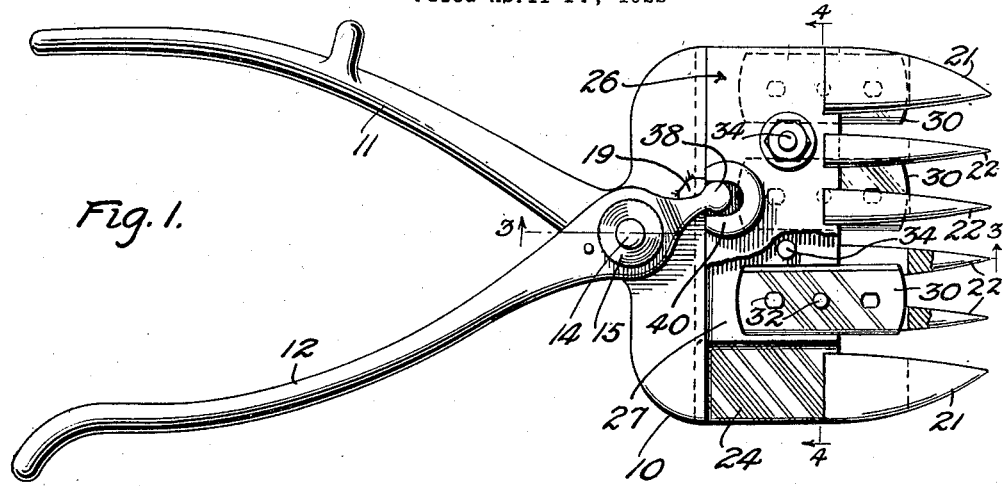
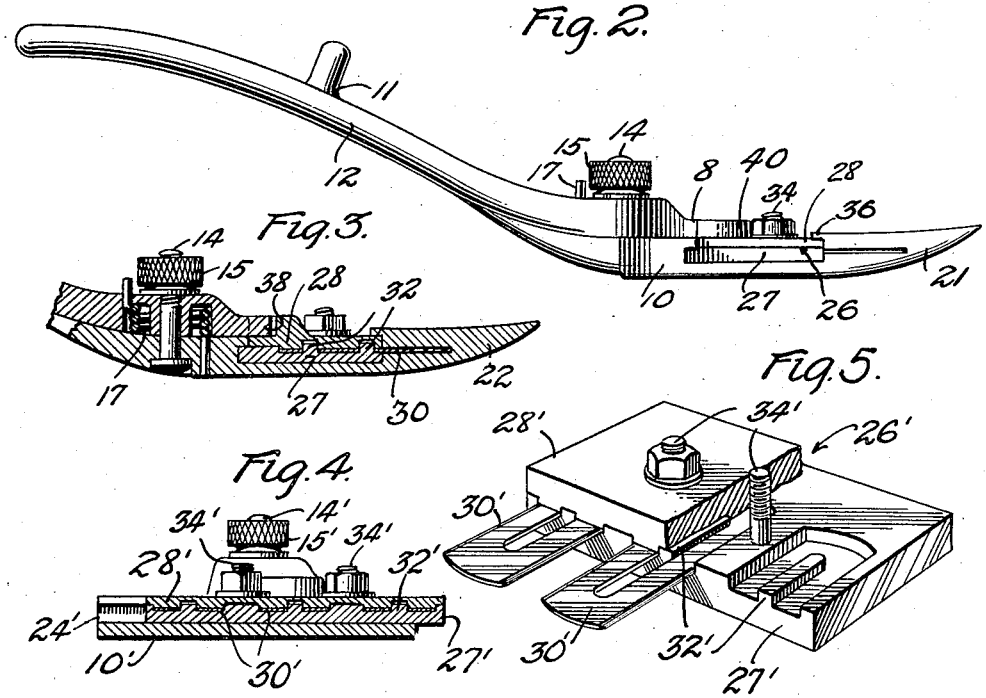
Witnesses
Inventor:
Homer A. Whitehorn Patented July 1, 1924.

1,499,896

UNITED STATES PATENT OFFICE.

HOMER A. WHITEHORN, OF PORT WASHINGTON, NEW YORK.

CUTTING IMPLEMENT.

Application filed April 14, 1922. Serial No. 552,755.

*To all whom it may concern:*

Be it known that I, HOMER A. WHITEHORN, a citizen of the United States of America, residing at Port Washington, in the county of Nassau and State of New York, have invented certain new and useful Improvements in Cutting Implements, of which the following is a full, clear, concise, and exact description.

This invention relates to cutting implements and more particularly to implements having one or more cutting blades mounted for movement transverse to a relatively fixed part.

For trimming privet hedge and other similar uses, such as cutting grass in places hard to reach with a lawn mower, it is customary to use tools having a shearing action. Due to the fact that the shearing edges are seldom sharp and also due to the friction necessarily present in a shearing device, these tools involve considerable labor in their operation.

An object of this invention is to render possible in tools for the above and similar purposes, the use of thin exceedingly sharp blades having a direct cutting action.

A further object of the invention is to provide detachable blades for a cutting tool and to provide for their ready detachment and replacement when dulled.

A further object of the invention is to increase the useful life of cutting blades.

A still further object of the invention is to employ used safety razor blades and the like for the above and similar purposes.

Other objects of the invention will be apparent from the following detail description and claims taken in connection with the accompanying drawings, in which Fig. 1 is a plan view partly broken away of one form of the invention; Fig. 2 is a side elevation; Figs. 3 and 4 are sectional views on lines 3—3 and 4—4 respectively in Fig. 1 looking in the direction of the arrows; and Fig. 5 is a detail view of a cutter bar similar to that shown in Fig. 1 but receiving a slightly different form of blade.

Referring to the drawings by reference numerals, the tool shown in Fig. 1 for the purpose of illustrating the invention, comprises a body portion 10 and handles 11 and 12, the handle 11 being preferably cast integral with the body portion 10. The handle 12 is pivoted to the body 10 as by bolt 14 and nut 15. As illustrated, the device is adapted to be operated by one hand, a spring 17 being employed to operate handle 12 to its outer portion, and a stop 19 normally preventing further outward movement of the handle 12.

The body 10 is provided with guards 21 and 22 preferably cast integral therewith. Slidably mounted in a recess 24 is a cutter bar 26 comprising a lower plate 27 and an upper plate 28 between which are secured blades 30 which will be recognized from the drawing as being the blades of a popular safety razor. Recesses in which the blades fit are provided in the upper surface of plate 27, projections 32 rising from the bottom of each recess in positions to be received by two of the three openings in each blade 30. The lower surface of plate 28 has projections to enter the recesses in plate 27 and openings to receive the pins or projections 32. It is apparent, therefore, that when plates 27 and 28 are placed together with blades therebetween, the blades are locked in position. The blades may, if desired, be clamped firmly in the cutter bar by any suitable means, such as bolts 34.

The cutter bar 26 is retained in position by flanges 36 on the guards 20 and 21 and at its rear edge by arm 38 on the pivoted handle 12. Arm 38 works in a slotted boss 40 on the plate 28 and serves the double function of operating the cutter bar and holding it in position. When it is desired to remove the cutter bar as, for example, to change the blades, the nut 15 is loosened far enough to permit the arm 38 to pass over stop pin 19. The cutter bar may then be slid out and new blades inserted in an obvious manner.

The cutter bar shown in Fig. 5 is adapted to hold blades 30′ of a type having a central slot, an elongated projection 32′ being provided on the lower plate 27′ to cooperate with a depression in the lower surface of plate 28′ to lock the blades in position. It will be noted that in both forms as shown in Figs. 1 and 5, the blades may be reversed when the edges first used are dull.

While only two forms of the invention have been described and illustrated, it is apparent that it may assume a wide variety of forms and dimensions adapted to various purposes. For example, mechanical power may be substituted for manual, and some form of motion other than rectilinear may be imparted to the blades.

What is claimed is:

1. A cutting tool comprising a thin blade having parallel cutting edges, relatively movable plates, said blade being carried by one of said plates, and an abutment carried by the other of said plates closely adjacent the path of movement of said blade.

2. A cutting tool comprising a plurality of thin blades each having parallel cutting edges, relatively moving plates, said blades being carried by one of said plates, and a plurality of abutments carried by the other of said plates closely adjacent the path of movement of said blades.

3. A cutting tool comprising a body plate having a plurality of slotted guard members, a plate slidably mounted on said body plate, and a plurality of thin double edged blades mounted on said slidable plate and traveling in the slots of said guard members, the two edges of said blades being parallel and being sharp enough to cut herbage without shearing it.

4. A cutting implement comprising a body member, a sliding member, said sliding member comprising a pair of plates, one of said plates being provided with recesses for blades, the other of said plates being provided with projections entering said recesses, and means to clamp said plates together.

5. A cutting implement comprising a base plate, a movable plate mounted thereon, a plurality of blades having cutting edges extending from end to end on both sides, and means for removably and reversibly securing each of said blades to said movable plate with either end extending beyond the periphery thereof.

In witness whereof, I hereunto subscribe my name this 13th day of April A. D., 1922.

HOMER A. WHITEHORN.